UNITED STATES PATENT OFFICE.

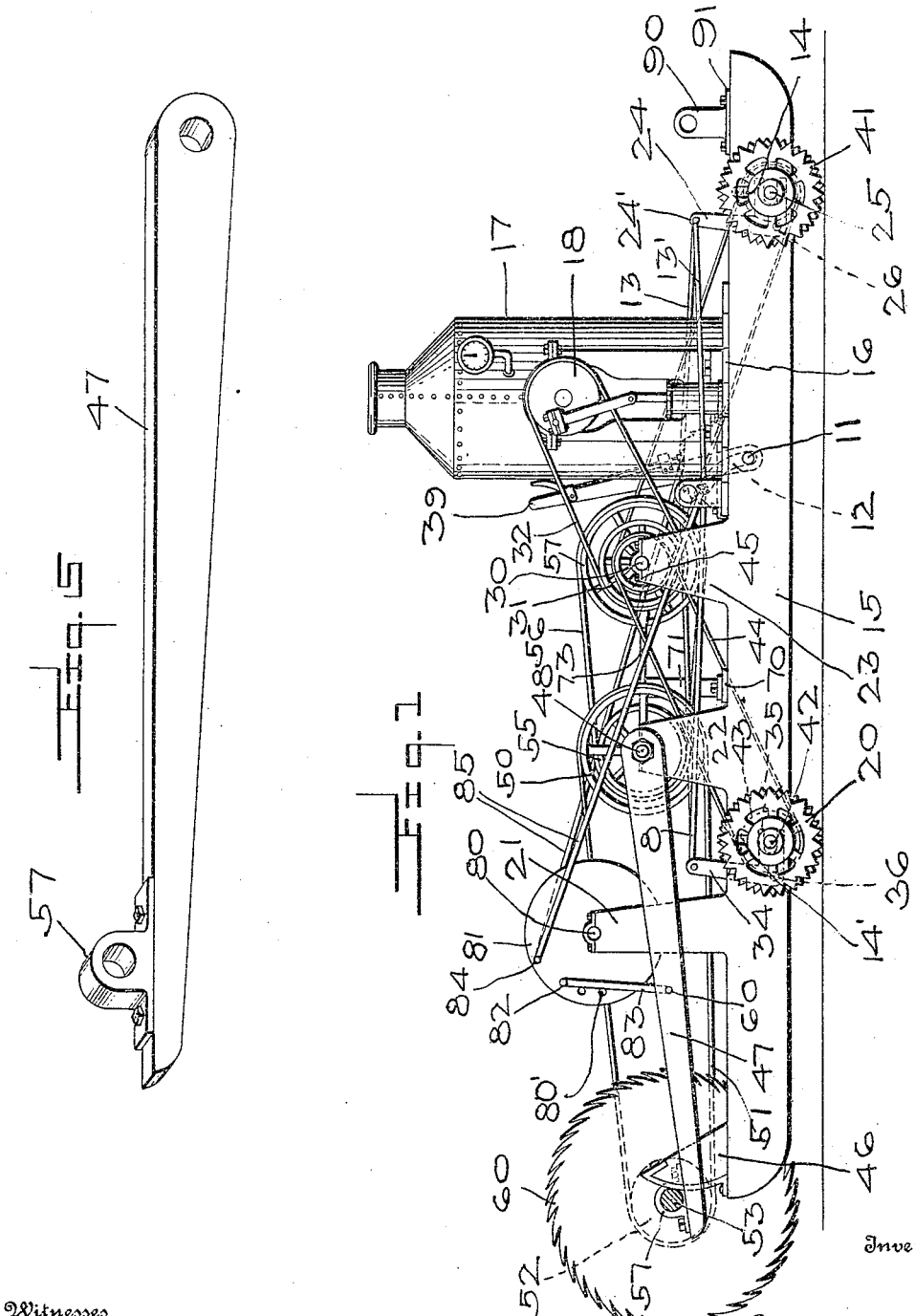

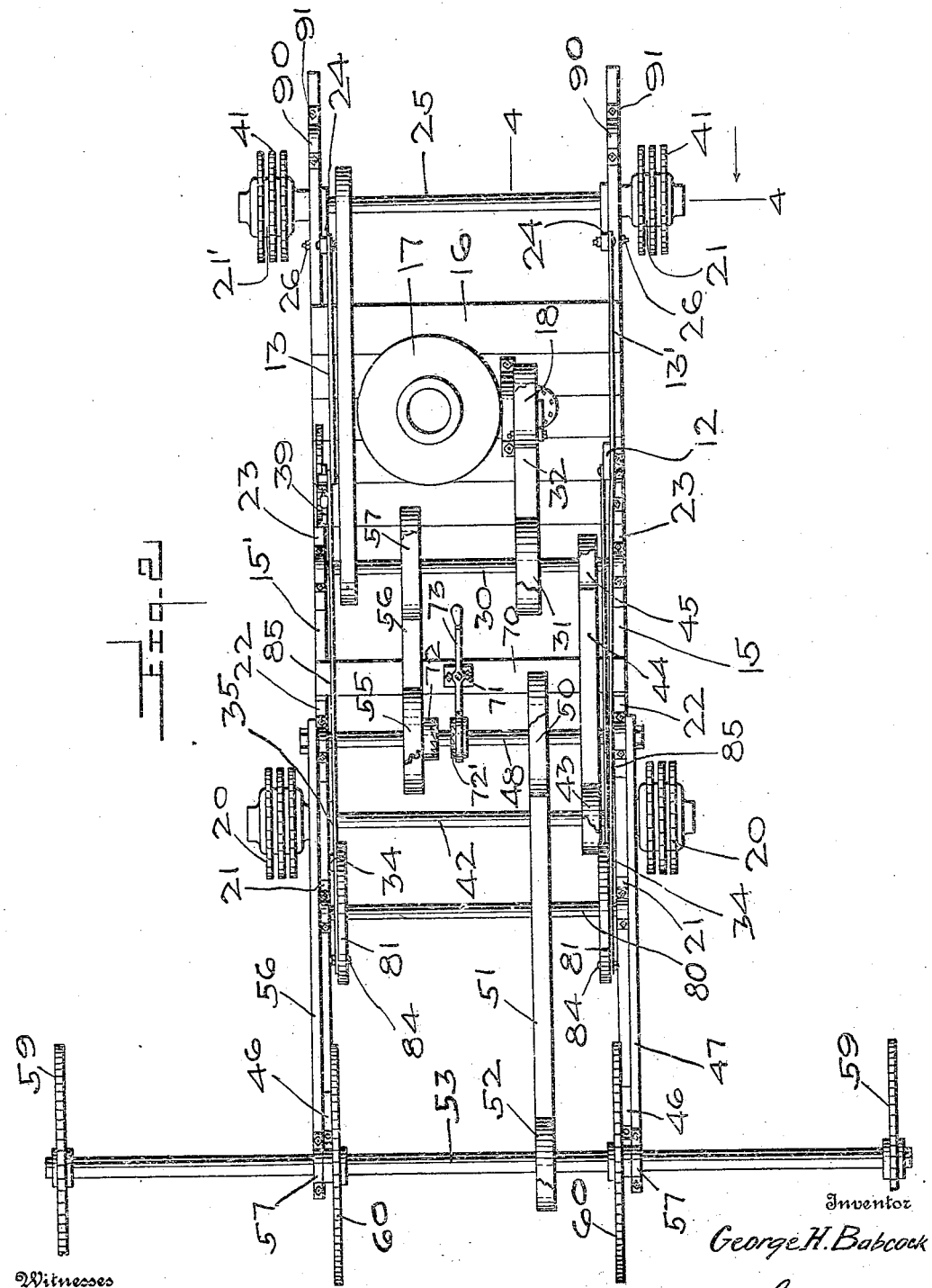

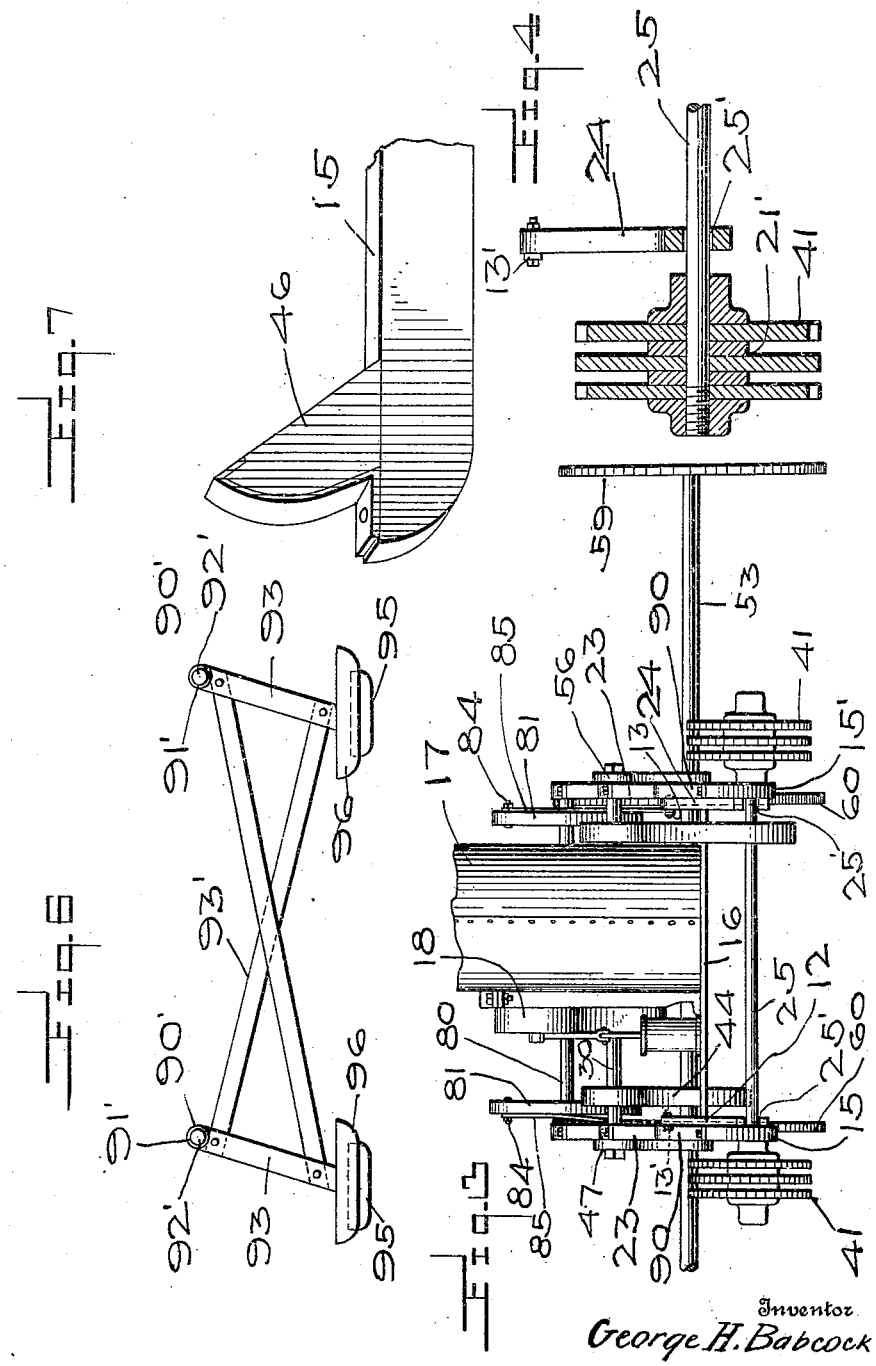

GEORGE H. BABCOCK, OF SHARON, CONNECTICUT.

GANG-SAW ICE-MACHINE.

955,744.  Specification of Letters Patent.  Patented Apr. 19, 1910.

Application filed June 23, 1909. Serial No. 503,857.

*To all whom it may concern:*

Be it known that I, GEORGE H. BABCOCK, a citizen of the United States, residing at Sharon, in the county of Litchfield and State of Connecticut, have invented certain new and useful Improvements in Gang-Saw Ice-Machines, of which the following is a specification.

This invention relates to certain new and useful improvements in ice cutting machines.

The object of this invention is, to provide an ice saw arranged to cut a plurality of grooves in an ice field, thereby facilitating the separating of the ice blocks so that the blocks may be expeditiously handled in harvesting the ice.

Another object is, to provide an ice cutting machine having blades adjusted to cut different thicknesses of ice, and in which the cutting blades can be laterally adjusted.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a portion of this specification, and in which like numerals of reference indicate similar parts in the several views, Figure 1 shows a side elevational view of an ice cutting machine embodying my invention. Fig. 2 is a top view thereof. Fig. 3 is an end view. Fig. 4 shows a transverse sectional view on line 4—4 of Fig. 2. Fig. 5 is an enlarged detached detail of one of the saw-carrying arms. Fig. 6 is a detail of the gage. Fig. 7 is an enlarged detached detail of one of the saw bearing posts.

In the accompanying drawings, the numerals 15 and 15' designate two runners which are connected by the transversely positioned planks or boards 16, forming a base upon which is held a suitable driving engine 17, having the drive wheel 18. Each runner has at its opposite ends a transversely positioned slot marked 14 and 14', respectively. Extending upward from the runners 15 and 15' at the ends marking the forward portion of the machine, are the two similar bearing posts 21, while near the engine are positioned the two similar bearing posts 23, and between these standards 21 and 23 are the two similar bearing standards 22.

Slidably held within the rear slots 14, is the wheel shaft 25 which at its outer ends carries the star wheels 41, each star wheel being made up of three plates held in spaced relation by means of the washers 21' as shown in the top view. The teeth of these blades 41 are held in a staggered position to insure a firm contact with the ice surface over which these wheels are made to travel.

Secured to the runners 15 and 15' are the bolts 26, each of these bolts carrying a bell crank 24 having an opening 24' within their upper ends, while the shorter member of these bell cranks is slotted as shown at 25'. These short ends of the bell cranks slidably engage the wheel shaft 25 as shown. By means of these pivotally held bell cranks the rear wheel shaft 25 and the connected star wheels are adjustably held. Extending from the upper end of these bell cranks are the connecting rods 13 and 13', the rod 13 being secured to the operating lever 39 while the rod 13' is secured to the crank arm 12 extending from the rock shaft 11. The operating lever 39 is provided with a dog engaging a rack segment so that this lever as well as the connected bell cranks may be held in any required position.

Held within the upper bearing ends of the standards 23, is the drive shaft 30, provided with the pulley 31 over which is guided a belt 32 passing over the main drive wheel 18 of the engine. The drive shaft is further provided with the pulley 45 near one end, while near the opposite end is secured the pulley 57.

Within the forward runner slot 14' is the wheel shaft 42, carrying the star wheels 20, this shaft 42 being further provided with the pulley 43, and passing over the pulleys 43 and 45 is the connecting belt 44.

Pivotally secured to the two runners 15 and 15' near the forward ends, are the two similar bell cranks 34, the fork ends 35 of which are made to support the front wheel shaft 42, these bell cranks being supported by means of the bolts 36 as shown.

From each upper end 34 extends a connecting rod 8, so that these forward bell cranks are also connected to the operating lever 39 and the crank 12 as are the rear bell crank levers 24. These four bell crank levers are held in similar position, so that on operating the rock shaft 11, all four of these bell crank levers are simultaneously actuated. By this means both the front and rear star wheels may be carried upward or downward, and these star wheels are of such a diameter that in one extreme position of the bell crank levers the periphery of these star wheels is inside of the bottom edges of the runners so that the frame may be used as a sled, or when the bell cranks are in the opposite position and the star wheels project beyond the edges of the runners the same may be propelled in the manner of a vehicle.

Revolubly held within the upper end of the bearing standards 22, is the clutch shaft 48 provided with the pulley 50, and the pulley 55, this pulley 55 being provided with the clutch collar 72, arranged to be brought into contact with the clutch collar 72' secured to the clutch shaft as shown. The clutch collar 72' is actuated by means of the lever 73 so that this shaft 48 may be thrown into or out of engagement with the drive pulley 55. Passing over the pulley 57 secured to the drive shaft 30 and the clutch pulley 55 is the belt 56. The lever 73 is supported by means of the standard 71 secured to the cross bar 70 carried by the runners as shown.

Revolubly held within the upper ends of the bearing standards 21 is the disk shaft 80, this shaft supporting two disks 81, each disk carrying a wrist pin 82, these pins 82 supporting the hangers 83, as shown. Each disk 81 is further provided with a pin 84, and from each pin 84 extends the connecting rod 85, these rods being also secured to the operating lever 39 and the crank arm 12, so that any rocking movement of the shaft 11 is imparted to the disk shaft 80.

Pivotally secured to the clutch shaft 48 are the two saw arms marked 47 and 56, respectively, these arms at their forward ends being provided with the bearings 57 revolubly holding the saw mandrel or shaft 58 carrying the two end saws 59 and the two intermediate saws 60, these saws being circular as shown. Each of the hangers 83 is secured to one of these saw arms by means of a bolt 60' so that as these disks 81 are partly rotated, a rocking movement is imparted to the saw arms resulting in the mandrel being carried upward or downward. The position of the saw arms 47 and 56 is determined by the position of the operating lever 39.

At the forward end each runner is provided with posts 46 and the saw mandrel contacts with these posts which serve to guide and hold the saw arms as well as the mandrel in proper alinement with the supporting frame. The saw mandrel is provided with the pulley 52 and passing over this pulley 52 and the pulley 50 secured to the clutch shaft, is the belt 51, so that a rotary movement may be imparted to this saw mandrel through the means of the clutch shaft.

The operation of my device is very simple. The ice cutter is self-propelling and in properly adjusting the lever 39 the entire frame is supported by means of the star wheels. After the saw has been carried upon the ice field and the main drive shaft has been set in motion, the clutch mechanism is set, so that the saw mandrel is rotated, the saw arms are then so set that the circular saws will cut a suitable distance below the surface of the ice field. As I have provided the mandrel with four circular saws, four parallel running ice grooves will of course be cut. The instrumentalities are so arranged that when the saw arms have been given proper adjustment the machine frame will be carried by the star wheels. By means of the members 83, which are adjustably held within openings 80' within the disk, as well as by means of the connecting rod 85, any desired adjustment may be imparted to the saw arms relative to the position of the star wheels.

Each runner is provided at two suitable points with the trunnions 90 secured by means of the plates 91, and these trunnions are arranged to receive the collars 90' extending from the bars 93, two such bars being in use, these bars being held to the trunnions by means of the pins 92' which pass through the openings 91' as shown. At their ends these bars 93 carry the shoes 96, each shoe being provided with the blade 95 and in order to hold these two bars 93 in parallel spaced relation, they are connected by means of the crosswise positioned brace bars 93'. The distance from the outer circular saw blades to the shoe blades 95 corresponds to the distance between the saw blades. After the machine has passed over the ice field the first time, on its return the machine is so guided that the shoes 95 will be held within the outermost ice furrow so that the machine in the subsequent cuttings will be guided in a line absolutely parallel to the first ice furrows. By this means all the ice blocks will be of an equal width. In cross cutting, of course, this same method is observed so that finally all the blocks will be of an exact size. This ice gage may be reversed to the opposite side as a second set of trunnions is provided as shown.

By means of my operating mechanism the same shafts carrying the saws as well as the star wheels may be adjusted to any desired position, and it is of course understood that any desired speed may be imparted to the machinery. The machine is very simple of construction, and positive in its operation and the several adjusting mechanisms are all readily accessible.

What is claimed is:

1. In an ice cutting machine, the combination with two runners, each runner having a slot at each end, a front wheel shaft adjustable within the slot at the front end of said runners, a rear wheel shaft adjustable within the slots at the rear end of said runners, two star wheels secured to each of said wheel shafts, four pivotally held bell cranks, each bell crank having a forked end, the four ends of said bell cranks straddling said wheel shaft, a rock shaft having a crank arm and an operating lever, connecting rods extending from said bell cranks to said crank arm and operating lever and rods connecting the operating lever to said cranks.

2. In an ice cutting machine, the combination with a suitably supported frame, of two bell cranks secured to the forward end of said supporting frame, two bell cranks secured to the rear end of said frame, a wheel shaft carried by the bell cranks at the forward end of said supporting frame, a wheel shaft carried by the bell cranks at the rear end of said supporting frame, a rock shaft having an operating lever at one end and a crank arm at the opposite end, a connecting rod extending from said lever to said crank arms and being secured to said bell crank, a suitably supported disk shaft carried by said frame, pulleys secured to said shaft, connecting rods secured to said operating lever and crank, two pivotally held saw arms, a saw mandrel carried at the end of said saw arms, a plurality of saws secured in said mandrel, and means to connect said saw arms to said disk shaft.

In testimony whereof I affix my signature, in presence of two witnesses.

GEORGE H. BABCOCK.

Witnesses:
 CHARLES W. EVERETT,
 GEORGE D. ODELL.